United States Patent [19]

Goss et al.

[11] 4,236,157

[45] Nov. 25, 1980

[54] TARGET DETECTION DEVICE

[75] Inventors: Daniel A. Goss; Roy M. Ito; Larry H. Josephson, all of Ridgecrest, Calif.

[73] Assignee: The United States of America as represented by the Secretary of the Navy, Washington, D.C.

[21] Appl. No.: 974,599

[22] Filed: Dec. 22, 1978

[51] Int. Cl.³ .................... G01S 13/42; F42C 13/04
[52] U.S. Cl. ............................... 343/7 PF; 102/214
[58] Field of Search ................. 343/7 PF, 5 PN; 102/214

[56] References Cited

U.S. PATENT DOCUMENTS

| 3,858,207 | 12/1974 | Macomber et al. | 343/7 PF |
|---|---|---|---|
| 3,868,686 | 2/1975 | Magorian | 343/5 PN X |
| 4,135,452 | 1/1979 | Kinsey et al. | 102/214 |
| 4,159,476 | 1/1979 | Kohler | 343/7 PF |
| 4,185,560 | 1/1980 | Levine | 102/214 |

Primary Examiner—Malcolm F. Hubler
Attorney, Agent, or Firm—R. S. Sciascia; W. Thom Skeer; Kenneth G. Pritchard

[57] ABSTRACT

A target detection device which functions a warhead at a predetermined height above the surface of the earth. A frequency modulated, pseudo-noise coded signal reflects from the surface of the earth to provide Doppler signals to a dual gate Doppler amplifier system. The voltage outputs of the two gates are compared; and a signal is sent to a threshold circuit to ascertain when a predetermined relationship exists between the two voltage outputs to decide when the target detection device is at a predetermined height, at which time a trigger signal actuates a time delay circuit using the Doppler frequency to generate a time delay that is dependent upon the vertical velocity of the target detection device. After the time delay, a signal is sent to a firing circuit which produces a firing pulse to function the warhead.

17 Claims, 7 Drawing Figures

TARGET DETECTION DEVICE

BACKGROUND OF THE INVENTION

1. Field of the Invention

The present invention relates to target detecting devices and, more particularly, to Doppler radar target detecting devices which function a warhead at a predetermined height above the ground.

2. Description of the Prior Art

There are prior art target detection devices which use frequency modulated radar signals to trigger the firing circuits of fuzes at various distances from a target. Some devices determine the time for triggering the firing circuit by measuring the range to the target. While this is an effective solution to the problem, the cost of implementation thereof has proven to be prohibitive for high volume production.

Other devices trigger the firing circuit at a fixed height above the surface of the earth, which makes the height of detonation uncertain. The degradation in effectiveness is accepted because of economic considerations.

SUMMARY OF THE INVENTION

The present invention reflects a frequency modulated, pseudo-noise coded radio frequency signal from the surface of the earth to provide Doppler signals to a dual gate Doppler amplifier system. The outputs of the target gate and guard gate are processed to ascertain when a predetermined relationship between them occurs to decide when the target detection device is at a predetermined height. When the device is at the predetermined height, a trigger signal actuates a time delay circuit, which uses the Doppler frequency to generate a time delay which is dependent upon the vertical velocity of the target detection device. After the time delay, a signal is sent to a firing circuit, which produces a firing pulse to function the weapon. The time delay lasts for an interval dependent upon the vertical velocity to cause detonation of the warhead at a predetermined height.

The present invention is a relatively inexpensive solution to the problem of detonating a warhead at a predetermined height above the surface of the earth. The present invention is particularly suited for use in fuel-air explosive weapons wherein liquid fuel is dispersed in an aerosol cloud and then detonated by a high-explosive charge.

DETAILED DESCRIPTION OF THE PREFERRED EMBODIMENT

Figure 1:
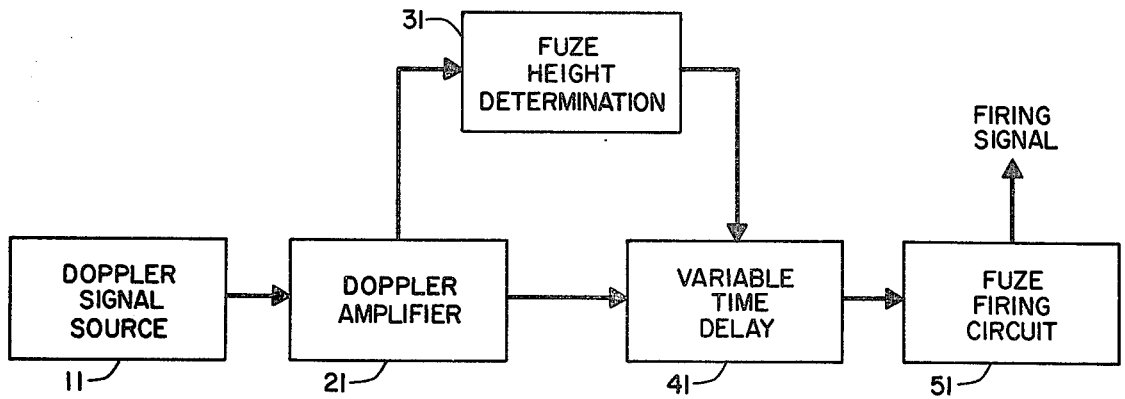
FIG. 1 is a block diagram of the invention.

Referring to FIG. 1, the output of a Doppler signal source 11 is amplified by a Doppler amplifier circuit 21 which has two outputs. One output from Doppler amplifier circuit 21 is processed by fuze height determination circuit 31. After fuze height determination circuit 31 decides that the weapon is at a predetermined height above the surface of the earth, it generates a trigger signal output which actuates a variable time delay circuit 41. The second output of Doppler amplifier circuit 21 is connected to variable time delay circuit 41, which generates a time delay dependent upon the Doppler frequency, which is dependent upon the vertical component of the velocity of the weapon. The time delay is velocity dependent so that the warhead may be functioned at a predetermined height above the ground. After the time delay, a signal is sent to fuze firing circuit 51, which then sends a firing pulse to function the warhead.

Figure 2:
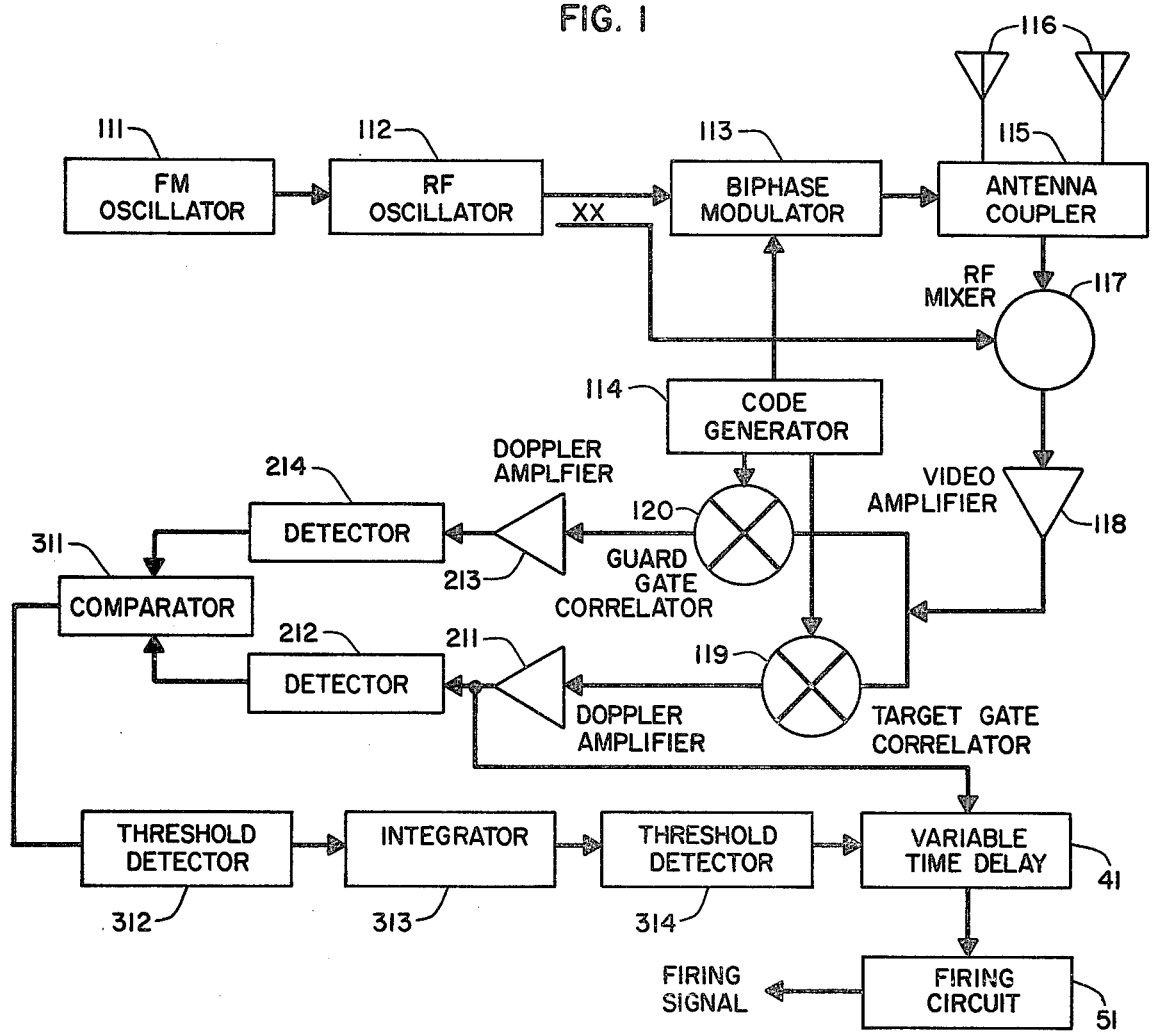
FIG. 2 is a block diagram which illustrates components of the Doppler signal source, Doppler amplifier and fuze height determination circuits.

The components of FIG. 1 are explained in greater detail referring to FIG. 2. The output of a frequency modulation oscillator 111 modulates the radio frequency signal output of radio frequency oscillator 112 to give the radio frequency signal a noise-like spectrum instead of a line spectrum. Radio frequency oscillator 112 produces a carrier signal and is connected to biphase modulator 113, which biphase modulates the signal with a pseudo-noise code generated by a code generator 114. An antenna coupler 115 delivers the frequency modulated, pseudo-noise coded radio frequency signal to a pair of antennas 116 that transmit the signal toward the target, which is the surface of the earth when the invention is used in a fuel-air air explosive device. Antennas 116 are used to receive the signal reflected from the target. If the target detection device is falling towards the target, the frequency of the return signal will be Doppler shifted from that of the transmitted signal.

The return signal is coupled through antenna coupler 115 to a radio frequency mixer 117, which is also coupled to radio frequency oscillator 112. Radio frequency mixer 117 removes the carrier frequency from the signal and has an output which is a pseudo-noise coded Doppler signal having frequency equal to the Doppler frequency. The mixer output is amplified by a video amplifier 118 whose output is connected to a target gate correlator 119 and a guard gate correlator 120.

Target gate correlator 119 has an output whenever the pseudo-noise coded Doppler signal matches with a delayed reference code signal from code generator 114. Otherwise, target gate correlator 119 decorrelates. Guard gate correlator 120 has an output whenever the pseudo-noise coded Doppler signal matches with a second delayed reference code signal from code generator 114. In developmental models of the invention the target gate reference code is delayed four bits, and the guard gate reference code signal is delayed five bits. Output signals from the target gate correlator 119 and guard gate correlator 120 go into two identical Doppler amplifiers that have integral, flat, staggered-tuned filters. The output signals of target gate Doppler amplifier 211 and guard gate Doppler amplifier 213 are respectively connected to a target gate detector 212 and a guard gate detector 214, where the signals are full wave rectified with the target gate signal and the guard gate signal having opposite polarity after rectification.

The guard gate signal is emphasized to offer protection against prefunctioning the target detection device on a jammer. In present models the emphasis is six dB. The target gate signal and the emphasized guard gate signal are summed by a comparator 311 which has an output signal proportional to the sum of the target gate signal and the emphasized guard gate signal. The output of comparator 311 goes into a first threshold detector 312, which is set for maximum sensitivity without false triggering. The output of threshold detector 312 is integrated by an integrator 313 which has a six to seven millisecond decision time. The integrator output is sent to a second threshold detector 314, which is set at approximately 80% of maximum integrator output. The output of threshold detector 314 is the trigger signal that initiates the variable time delay.

Figure 3:
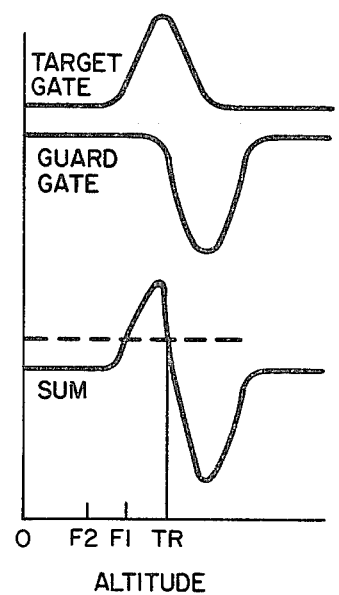
FIG. 3 shows the outputs and sum of the outputs of the target gate detector and the guard gate detector.

The fuzing height is a function of the clock frequency of code generator 114 and the number of bit delays used in target gate correlator 119 and guard gate correlator 120. FIG. 3 shows the response of the individual gates and the combined response, which is the output of the comparator 311. The individual gate response may be wide, but the summed outputs have a steep slope at the overlap region. This provides a precise fuzing height.

Figure 4:
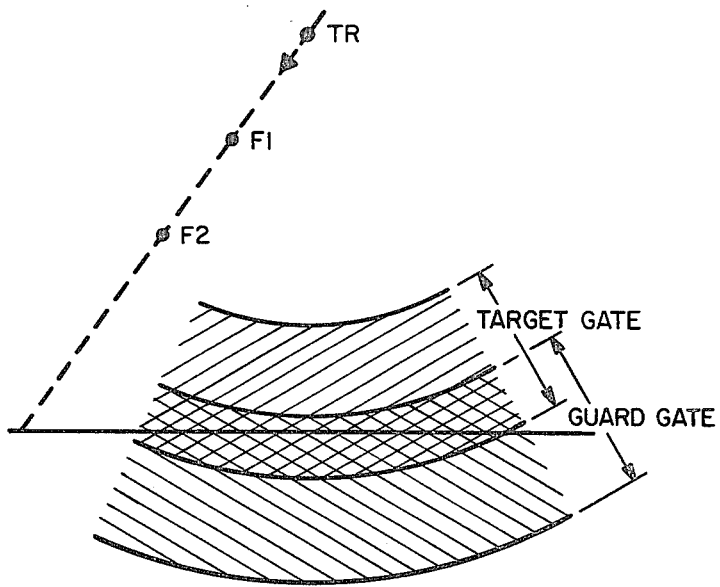
FIG. 4 illustrates the sequence of events controlled by the invention.

FIG. 4 shows the sequence of events leading to weapon function when the invention is used in a fuel-air explosive device. An arming wire is pulled when the weapon is released from an aircraft, and power is applied to the safe-and-arm device and to the target detection device. As the weapon approaches the ground and passes through a predetermined detection height, the target detection device generates a trigger signal, TR, after a nominal integration time. The trigger signal starts a variable time delay of zero to 300 milliseconds that is a function of terminal vertical velocity. At the end of this delay, a firing pulse, F1, is sent to the safe-and-arm device to eject the cloud detonators. F1 also starts a 28 millisecond fixed time delay in the safe-and-arm device, at the end of which a second firing pulse, F2, is generated to burst the canister. The cloud detonators ejected by F1 have their own pryrotechnic time delay and are slowed down by small parachutes. The detonators enter the cloud and initiate the fuel-air detonation. Detonation of the fuel-air cloud at a predetermined height is desirable for optimum weapon effectiveness. The velocity-dependent time delay in the present invention accomplishes this result by causing firing pulse F1 to be sent to the safe-and-arm device at the proper time to compensate for the velocity of the weapon and for the fixed time delays inherent in other parts of the weapon.

Figure 5:
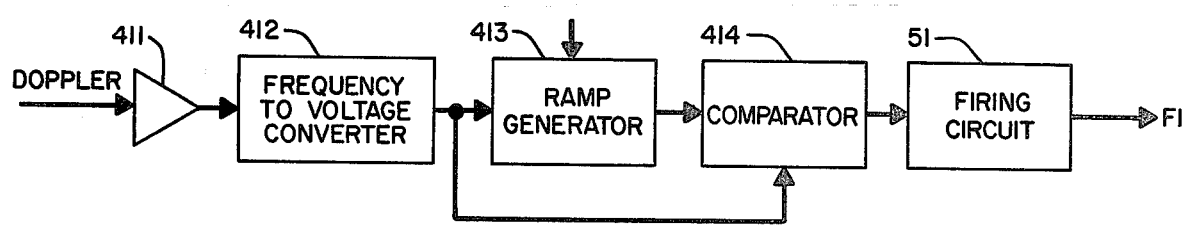
FIG. 5 is a block diagram of the variable time delay circuit.

The mode of operation of the variable time delay is explained with reference to FIG. 5. The output of target gate Doppler 211 is connected to an amplifier 411, which amplifies the Doppler signal and converts it into a square wave. The square wave is fed into a frequency-to-voltage converter 412, which converts the square wave into a control voltage that is proportional to the Doppler frequency.

Figure 6:
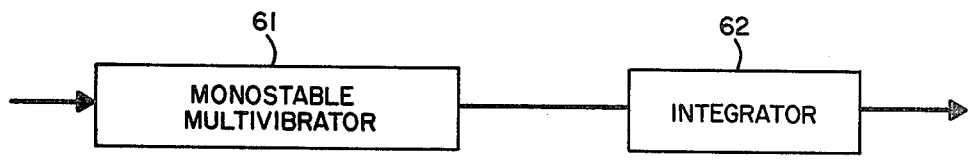
FIG. 6 is a block diagram of the frequency-to-voltage converter.

The frequency-to-voltage converter used in developmental models is illustrated in FIG. 6. The square wave output of amplifier 411 is connected to a monostable multivibrator 61 which generates a constant-amplitude, constant-width pulse for each positive-going zero crossing of the square wave. These pulses have a duty factor proportional to the Doppler frequency. The pulses are then integrated by integrator 62 and thereby converted into the control voltage.

A ramp generator 413 is actuated by the trigger signal from threshold detector 314. The control voltage is applied to ramp generator 413, which generates a ramp voltage having a slope proportional to the control voltage. The ramp voltage and the control voltage are applied to a comparator 414 which produces an output signal which actuates a firing circuit 51 whenever the ramp voltage equals the control voltage.

Figure 7:
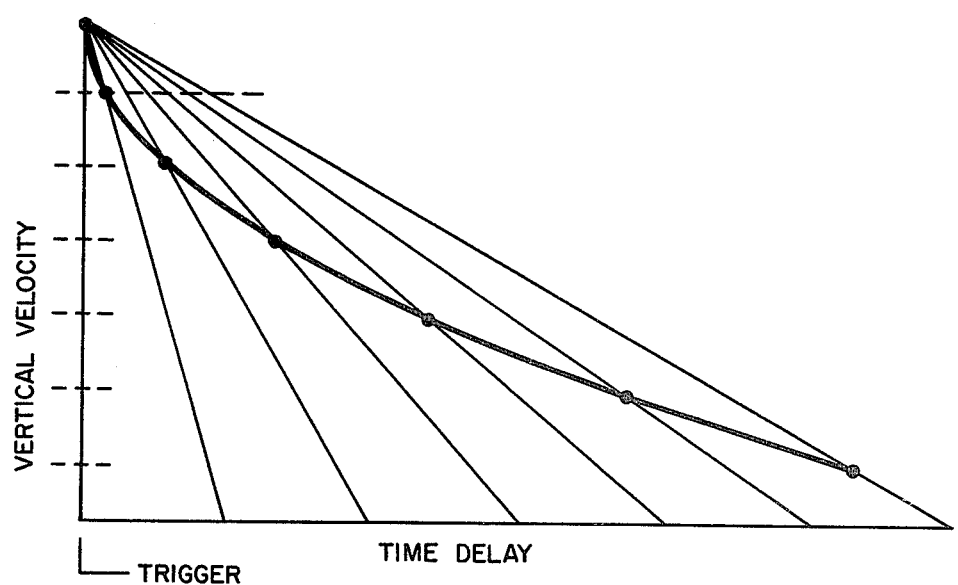
FIG. 7 shows the relationship between the time delay and the vertical velocity.

FIG. 7 illustrates the relationship between the vertical velocity and the time delay generated by the target detection device. The time delay occurs during the time interval required for the ramp voltage to equal the control voltage. The control voltage is proportional to the Doppler frequency, which is proportional to the vertical velocity. The slope of the ramp voltage is proportional to the control voltage; and, therefore, proportional to the vertical velocity. Therefore, the time required for the ramp voltage to equal the control voltage can be made to depend inversely upon the vertical velocity of the target detection device.

What is claimed is:

1. A target detection device comprising:
   means for supplying Doppler signals, said Doppler signals having a Doppler frequency determined by the vertical velocity of said target detection device;
   means for amplifying said Doppler signals connected to said means for supplying Doppler signals;
   means for determining fuze height responsive to said means for amplifying said Doppler signals to generate a trigger output whenever said target detection device is a predetermined height above a target; and
   means for producing a velocity-dependent time delay operatively associated with said means for determining fuze height and said Doppler amplifier means, said velocity-dependent time delay being initiated by said trigger signal and being dependent in duration upon said Doppler frequency.

2. A target detection device according to claim 1 further including a fuze firing circuit connected to said means for producing a velocity-dependent time delay.

3. A target detection device according to claim 1 wherein said means for supplying Doppler signals comprises a radio frequency oscillator which produces a radio frequency carrier signal.

4. A target detection device according to claim 3 wherein said radio frequency oscillator is frequency modulated.

5. A target detection device according to claim 3 wherein said means for supplying Doppler signals further includes a biphase modulator having first and second inputs, said first input connected to said radio frequency oscillator to receive an output therefrom.

6. A target detection device according to claim 5 wherein said means for supplying Doppler signals further includes a pseudo-noise code generator having first, second, and third outputs, said first output connected to said second input of said biphase modulator.

7. A target detection device according to claim 1 wherein said means for supplying Doppler signals further includes:
   means for sending radio frequency signals to be reflected from a target; and
   means for receiving radio frequency signals reflected from a target.

8. A target detection device according to claim 7 wherein said means for sending radio frequency signals to be reflected from a target and said means for receiving radio frequency signals reflected from a target comprises:

an antenna for sending and receiving radio frequency signals; and an antenna coupler connected between said biphase modulator and said antenna.

9. A target detection device according to claim 7 wherein said means for supplying Doppler signals further comprises a radio frequency mixer having first and second inputs, said first input connected to said means for receiving radio frequency signals to process said radio frequency signals received thereby and said second input coupled with said radio frequency oscillator to receive a signal therefrom, said radio frequency mixer configured to remove said carrier radio frequency signal from said radio frequency signal which has been reflected from a target and received by said antenna and to produce an output which is a pseudo-noise coded Doppler signal having a frequency equal to said Doppler frequency.

10. A target detection device according to claim 9 wherein said means for supplying Doppler signals further includes a target gate correlator having two inputs, said first input connected with said radio frequency mixer to receive said pseudo-noise coded Doppler signal therefrom and said second input connected with said second output of said pseudo-noise code generator to receive a reference code signal therefrom, said target gate correlator configured to have an output only when said pseudo-noise coded Doppler signal matches said reference code signal delayed by a first predetermined number of bits.

11. A target detection device according to claim 9 wherein said means for supplying Doppler signals further includes a guard gate correlator having two inputs, said first input connected to said radio frequency mixer to receive said pseudo-noise coded Doppler signal therefrom and said second input connected to said third output of said pseudo-noise code generator to receive a reference code signal therefrom, said guard gate correlator configured to have an output only when said pseudo-noise coded Doppler signal matches said reference code signal delayed by a second predetermined number of bits.

12. A target detection device according to claim 11 wherein said means for amplifying said Doppler signals comprises:

a target gate Doppler amplifier connected to said means for supplying Doppler signals to receive an output therefrom;

a target gate detector connected to said target gate Doppler amplifier;

a guard gate Doppler amplifier connected to said means for supplying Doppler signals to receive an output therefrom;

a guard gate detector connected to said guard gate Doppler amplifier.

13. A target detection device comprising:

means for supplying Doppler signals, said Doppler signals having a Doppler frequency determined by the vertical velocity of said target detection device;

means for coding connected to said means for supplying Doppler signals to produce coded Doppler signals;

a target gate correlator operatively associated with said means for coding to receive a reference code signal therefrom and with said means for supplying Doppler signals, said target gate correlator having an output only when said coded Doppler signal matches said reference code signal delayed by a first predetermined number of bits;

a guard gate correlator operatively associated with said means for coding to receive a reference signal therefrom and with said means for supplying Doppler signals, said guard gate correlator having an output only when said coded Doppler signal matches said reference code signal delayed by a second predetermined number of bits;

a target gate Doppler amplifier connected to said target gate correlator;

a target gate detector connected to said target gate Doppler amplifier;

a guard gate Doppler amplifier connected to said guard gate correlator;

a guard gate detector connected to said guard gate Doppler amplifier, said target gate detector and said guard gate detector configured to have outputs of opposite polarity;

means for determining fuze height operatively associated with said target gate detector to receive a target gate signal therefrom and said guard gate detector to receive a guard gate signal therefrom and to produce an output trigger signal only if said target gate signal exceeds said guard gate signal by a predetermined amount;

means for converting frequency-to-voltage connected to said target gate Doppler amplifier to convert said Doppler signal into a control voltage which is proportional to said Doppler frequency;

means for generating a ramp voltage operatively associated with said frequency-to-voltage conversion means and said means for deciding fuze height, said ramp voltage being initiated by said trigger signal and having a time rate of change proportional to said control voltage; and a comparator connected between said means for converting frequency-to-voltage and said means for generating a ramp voltage to produce an output when said ramp voltage equals said control voltage.

14. A target detection device according to claim 12 or claim 13 wherein said means for determining fuze height comprises:

a comparator having first and second inputs, said first input connected to said target gate detector to receive the output therefrom, said second input connected with said guard gate detector to receive the output therefrom, said comparator configured to have an output signal proportional to the sum said target gate detector output and said guard gate detector output.

15. A target detection device according to claim 14 wherein said means for determining fuze height further comprises:

a first threshold detector connector to said comparator to receive the output therefrom;

an integrator connected to said first detector to receive an output signal therefrom; and a second threshold detector connected to said integrator to receive an output therefrom, said second threshold detector configured to have an output trigger signal only if said integrator output signal voltage exceeds a predetermined value.

16. A target detection device according to claim 1 wherein said means for producing a velocity-dependent time delay comprises:

means for amplifying and converting said Doppler signal into a square wave;

frequency-to-voltage conversion means for converting said square wave into a control voltage proportional to said Doppler frequency operatively associated with said means for amplifying and converting said Doppler signal into a square wave;

means for generating a ramp voltage operatively associated with said frequency-to-voltage conversion means and said means for generating a trigger signal, said ramp voltage being initiated by said trigger signal and having a time rate of change proportional to said control voltage;

an comparator operatively associated with said frequency-to-voltage conversion means and said means for generating a ramp voltage to produce an output voltage when said ramp voltage equals said controlled voltage; and a firing circuit means for producing a firing pulse whenever said firing circuit means receives said output voltage from said comparator.

17. A target detection device according to claim 13 or claim 16 wherein said means for converting frequency-to-voltage comprises:

a monostable multivibrator which generates a constant amplitude, constant-width pulse for each positive-going zero crossing of said square wave, said pulses having a duty factor proportional to said Doppler frequency; and an integrator configured to integrate said pulses, thereby producing said controlled voltage which is proportional to said Doppler frequency.

* * * * *